L. L. KNOX.
FURNACE.
APPLICATION FILED APR. 3, 1918.

1,315,971.

Patented Sept. 16, 1919.
3 SHEETS—SHEET 1.

WITNESSES
R. A. Balderson
F. N. Windridge

INVENTOR
L. L. Knox
by Bakewell, Byrnes, Parmelee
Attys.

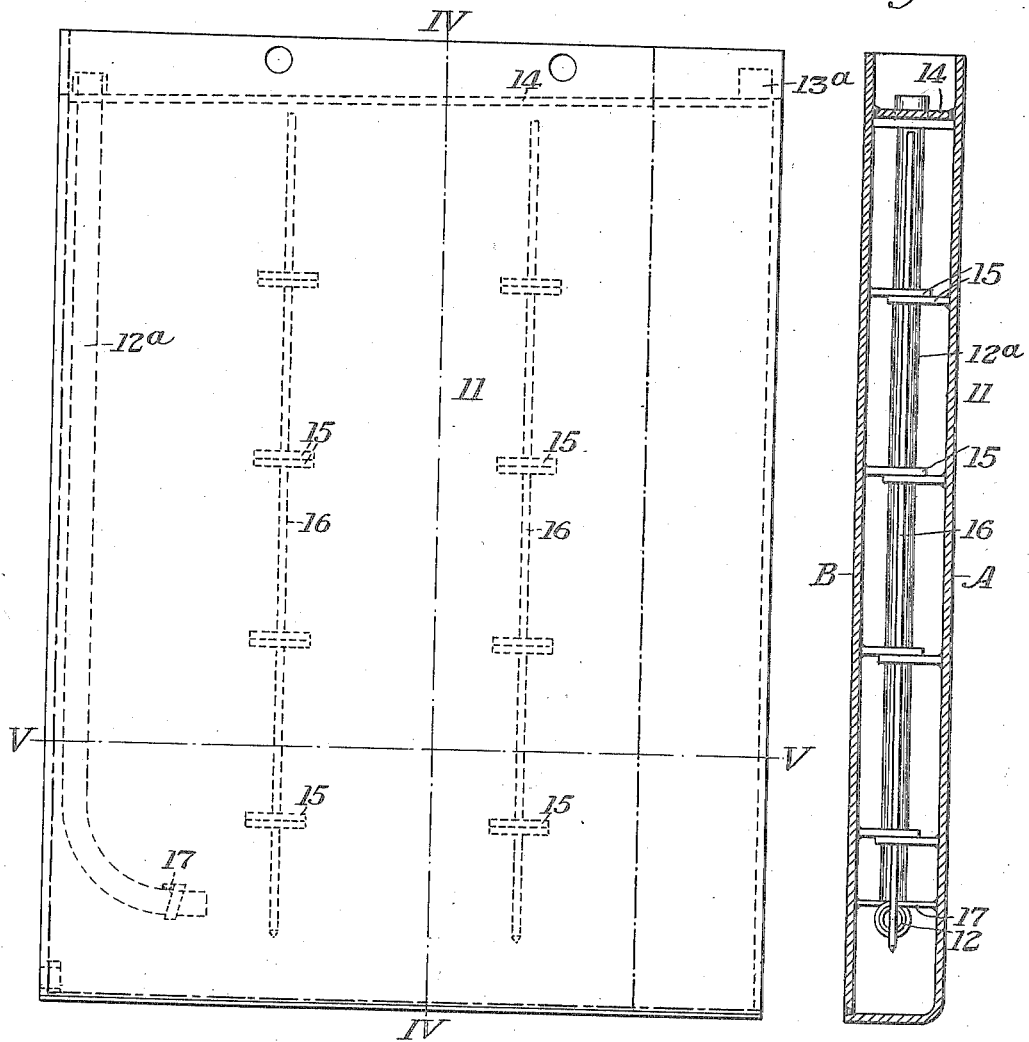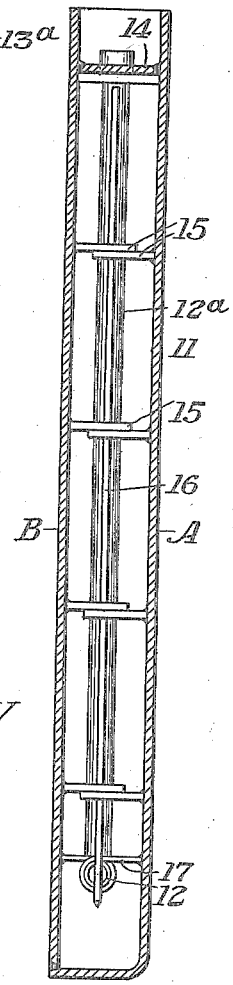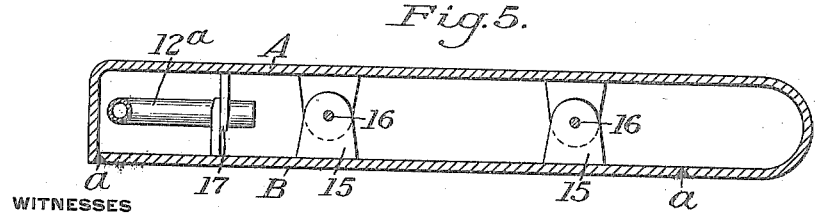

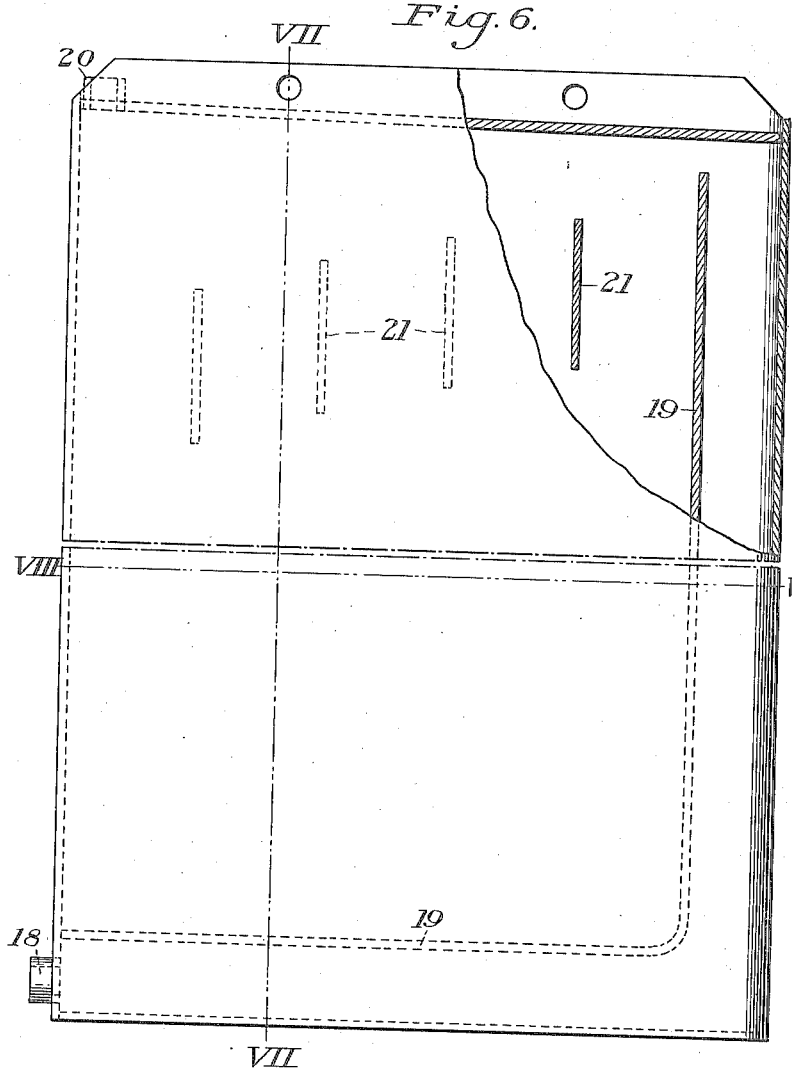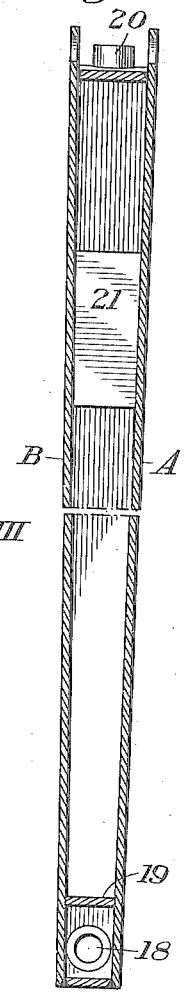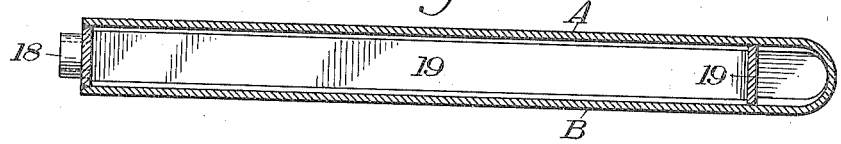

UNITED STATES PATENT OFFICE.

LUTHER L. KNOX, OF BELLEVUE, PENNSYLVANIA, ASSIGNOR TO BLAW-KNOX COMPANY, OF PITTSBURGH, PENNSYLVANIA, A CORPORATION OF NEW JERSEY.

FURNACE.

1,315,971.  Specification of Letters Patent.  Patented Sept. 16, 1919.

Application filed April 3, 1918. Serial No. 226,401.

*To all whom it may concern:*

Be it known that I, LUTHER L. KNOX, a resident of Bellevue, Allegheny county, Pennsylvania, have invented a new and useful Improvement in Furnaces, of which the following is a full, clear, and exact description, reference being had to the accompanying drawings, forming part of this specification, in which—
Figure 1 is a horizontal section of one end portion of a furnace embodying my invention;

Fig. 3 is a plan view of a modified form of cooler;

Figs. 4 and 5 are sectional views taken, respectively, on the lines IV—IV and V—V of Fig. 3;
Fig. 6 is a plan view, partly broken away, showing another modification of the coolers; and Figs. 7 and 8 are sections taken on the lines VII—VII and VIII—VIII, respectively, of Fig. 6.

Figure 1:
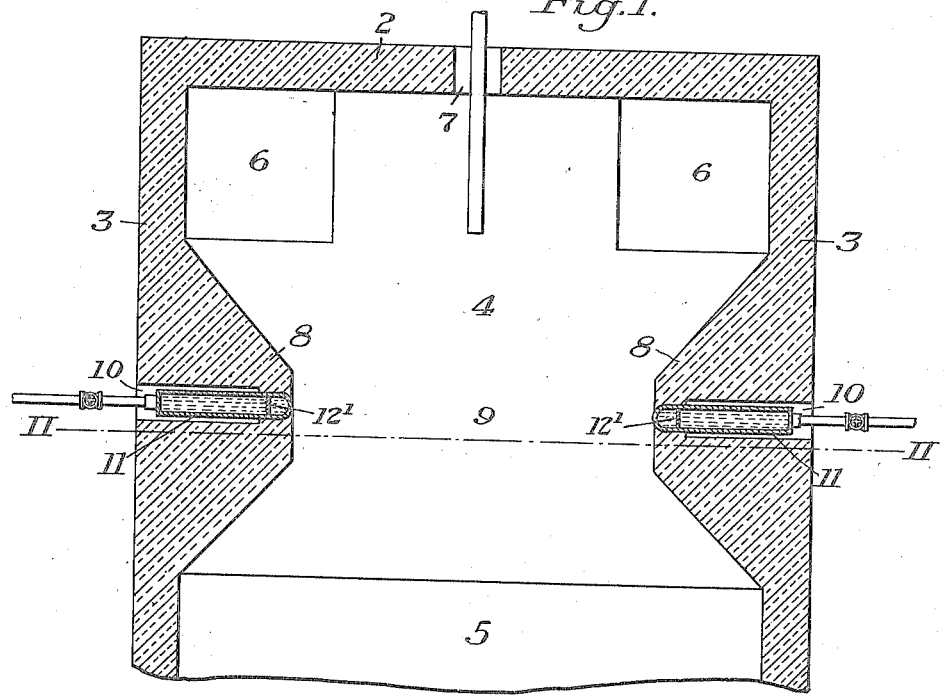

My invention has relation to furnaces, and more particularly to the construction of a means for cooling the so-called "monkey" walls of furnaces. The object of my invention is to provide means of simple and effective character, whereby these walls may be protected against the destructive action of the heat. My invention also provides a novel form of cooler for this purpose.
In the accompanying drawings, I have shown my invention applied to a furnace of the oil-burning type, but I desire it to be understood that this is for the purpose of illustration only, and that the invention is adapted to furnaces of various types.

Referring to the drawings, 2 designates one of the end walls of the furnace and 3 the side walls. 4 is the mixing and combustion chamber, and 5 a portion of the hearth of the furnace. 6 designates air uptakes which bring air into the rear portion of the mixing and combustion chamber, and 7 is an opening through which an oil burner or burners may be introduced. 8 designates the monkey walls which, in the construction shown, are of generally triangular form, being inward projections of the side walls at opposite sides and forming between them the restricted throat or passage 9, forming the outlet of the mixing and combustion chamber into the hearth portion of the furnace. Each of these monkey walls is formed with an opening 10, which extends vertically therein through the roof of the furnace, each of the openings being preferably extended out through the side wall of the furnace.

Placed in each of the openings 10 is a hollow cooling structure 11, which may be of any suitable form. 12 designates a water inlet pipe opening into the cooler at one side of a depending baffle 12$^b$; and 13 is an outlet connection. In Figs. 3, 4 and 5, I have illustrated in detail a slightly different form of cooler which may be employed. This cooler consists of a hollow sheet metal box-like structure of generally rectangular form, having a water inlet pipe 12$^a$, extending downwardly therein, and arranged to discharge near the bottom of the structure, the opposite upper corner of the structure having the outlet 13$^a$ for the heated water. The top wall 14 of the structure is preferably inclined upwardly and toward the side thereof, where the outlet 13 is located, in order to facilitate the escape of steam and prevent steam pockets. The structure may be conveniently formed of sheet metal plates, suitably welded together. The particular construction shown is formed of the two plates A and B, the plate A being flanged to form the side and bottom walls of the structure and being preferably bent around the inner or nose end of the structure, as indicated in Fig. 5, so as to form a part of the opposite side wall. The plate B is welded at one edge to the free edge of this bent portion and at its other edge to the adjacent flange of the plate A, the welding lines being indicated at *a*. The top wall 14 may consist of a separate plate welded in place, as best shown in Fig. 4. The structure may be suitably braced interiorly by two sets of overlapping lugs or projections 15, one set welded to each of the plates A and B, with their inner end portions overlapping and provided with registering perforations, through which the keys 16 are inserted before the top 14 is welded in place. 17 designates a suitable tie or stay for the pipe 12.

Figure 2:
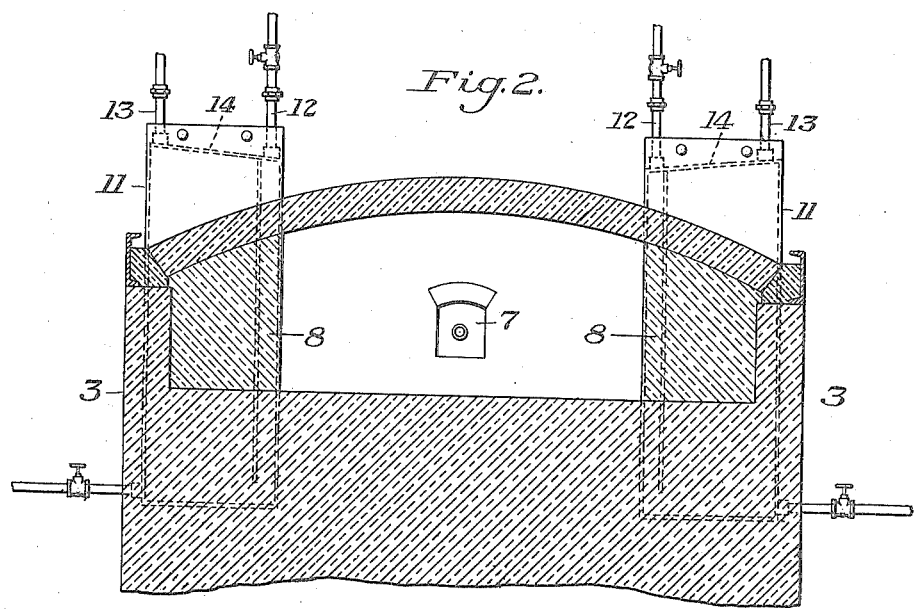
Fig. 2 is a transverse section on the line II—II of Fig. 1;
15

The cooling structures are preferably made of such height that they will extend considerably above the roof of the furnace, as shown in Fig. 2, thereby providing for the use of relatively large bodies of water and also providing a considerable area of exposed heat-radiating surface. The inner or nose portions of the cooling structures are preferably made to fit closely the adjacent portions of the walls to be cooled, as shown in Fig. 1, and to extend through to the inner surface of such walls. The remaining portions of the structures are preferably separated from the walls of the opening 10 by air spaces, into which the air can readily enter at the open sides, so as to provide for further air cooling.

In Figs. 7, 8 and 9, I have shown another form of cooler, in which the cooling fluid enters at 18, at one of the lower corners, and below the horizontal portion of an angular baffle 19. This baffle extends across the lower portion of the structure from the inlet side, to a point near the opposite side, where it is bent upwardly, its vertical arm terminating a short distance below the top wall of the structure. The latter is inclined upwardly from this side to the opposite side, where the outlet 20 is provided. 21 designates internal reinforcing members or spacers, which are placed in arch arrangement in that portion of the structure which in use is in the roof arch of the furnace.

By my invention I provide a furnace with a combustion chamber having a laterally restricted outlet into the furnace proper and which opening or throat may be kept of substantially uniform width throughout the life of the furnace. The monkey walls by means of which this restricted opening is provided are, of course, subject to intense heat over the major portion of their area; and tend to rapidly burn away thus varying its width, which it is desired to keep constant for its effect upon the mixing action of the air and gas and the combustion. By cooling means, such as described, these monkey walls are effectively protected and the said opening or throat is held at a constant width, being fixed by the exposed inner or nose portions 12' of the coolers. The coolers are adapted to contain a relatively large volume of water, a substantial portion of which is at all times above the furnace roof, thereby enabling the heat to be rapidly dissipated. This dissipation is further greatly assisted by the open spaces at the sides of the outer portions of the coolers. In case of leakage or other defect the coolers can be readily removed and replaced.

I do not wish to limit myself to the particular construction of the monkey walls herein shown, as this construction will necessarily vary somewhat in different types of furnaces with which my invention may be used, and the form and construction of the coolers may also be changed within the scope of the appended claims.

I claim:

1. A furnace having its combustion chamber formed with opposite inwardly projecting monkey walls, and hollow cooling members seated in said walls, said members having substantial portions thereof projecting upwardly through and above the roof of said chamber, together with means for causing an upward flow of the cooling medium through said members, the projecting portions of the members being exposed for air cooling, substantially as described.

2. A furnace having its monkey walls provided with vertical openings extending upwardly through the furnace roof and also laterally out through the sides thereof, and hollow water-cooled structures seated in said openings, said structures having substantial portions thereof extending upwardly into exposed positions above the roof, substantially as described.

3. A furnace having its monkey walls provided with vertical openings, which extend through the sides thereof, and hollow water-cooled structures seated in said openings in planes at substantially right angles to the longitudinal axis of the furnace, the inner end portions of said structures being in contact with the adjacent portions of the monkey walls, and other portions of said structures being separated from the monkey walls to provide for air circulation, substantially as described.

4. A furnace having its combustion chamber formed with opposite inwardly projecting monkey walls and hollow cooling members seated in said walls, said members having substantial portions thereof projecting upwardly through and above the roof of said chamber, together with means for causing an upward flow of the cooling medium through said members, the projecting portions of the members being exposed for air cooling, and said walls having air-circulating spaces about portions of said members, substantially as described.

In testimony whereof, I have hereunto set my hand.

LUTHER L. KNOX.